Dec. 7, 1943.    R. M. ROOKE    2,336,297
BRAZING OR WELDING OF PIPE ENDS
Filed July 8, 1941
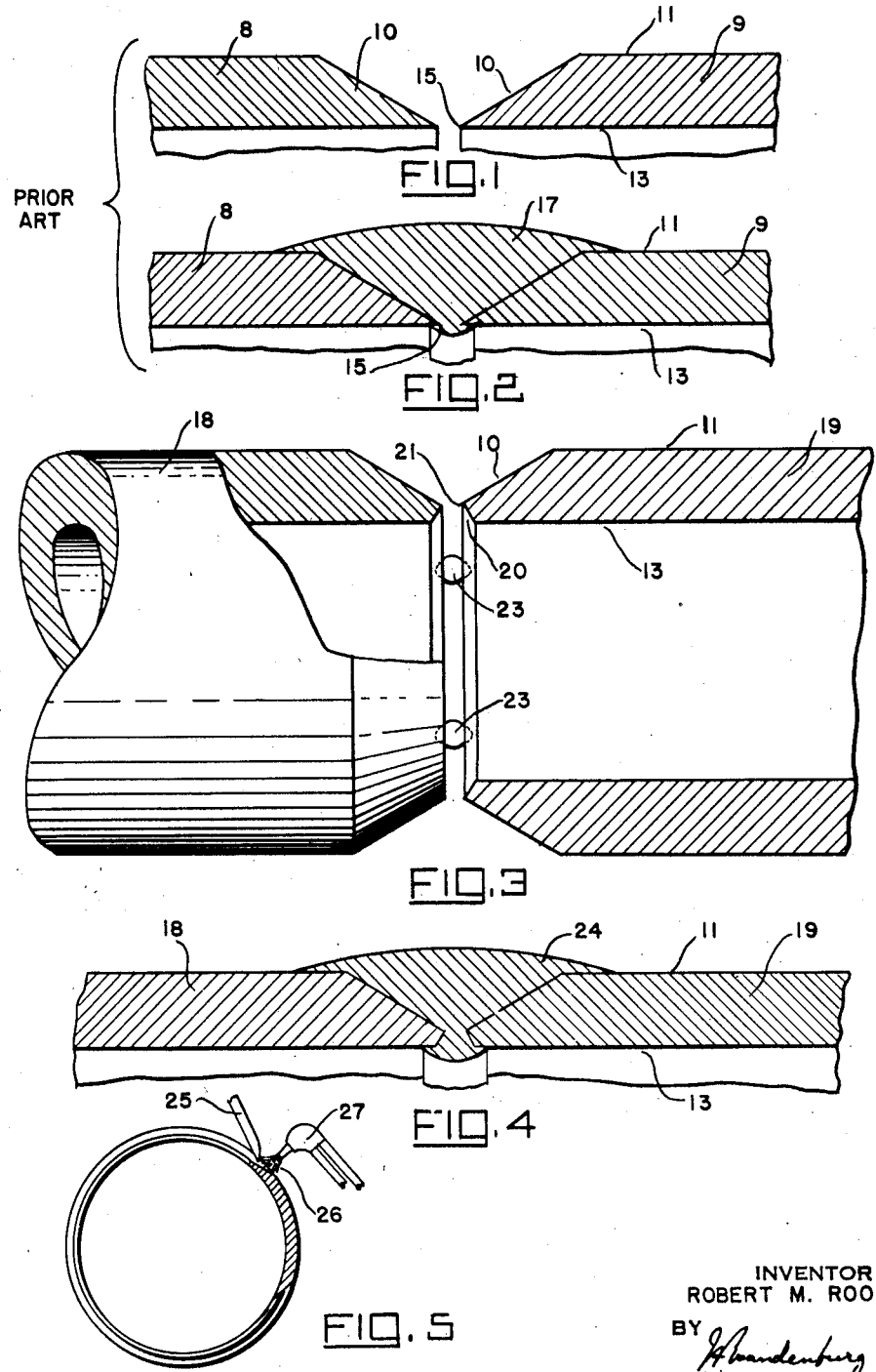
INVENTOR
ROBERT M. ROOKE
BY
ATTORNEY Patented Dec. 7, 1943

2,336,297

UNITED STATES PATENT OFFICE 2,336,297

BRAZING OR WELDING OF PIPE ENDS

Robert M. Rooke, West Long Branch, N. J., assignor to Air Reduction Company, Incorporated, New York, N. Y., a corporation of New York Application July 8, 1941, Serial No. 401,410

5 Claims. (Cl. 113—112)

This invention relates to welding, especially to the welding of pipe ends, and the term "welding" is used in the description and claims in a broad sense to include brazing or bronze welding.

When pipes are to be joined together end to end, by welding with the addition of metal from a welding rod, it is well known to bevel the pipe ends so that the seam between the end faces is of V cross-section. It is necessary for the welder to exercise great care in the use of a torch in order to prevent the lower portion of the V, where the section of metal is thinner, from being overheated. One object of this invention is to provide an end form that is less likely to become overheated, and another object is to provide an improved method of uniting pipe ends, which method does not require as much skill or such a careful technique as does the welding of the usual bevel pipe ends.

Safeguarding against overheating of beveled pipe ends is particularly advantageous when welding carbon-molybdenum alloy steel pipe which become porous when overheated, and in the brazing of galvanized pipe. With galvanized pipe there are several considerations. The galvanizing is destroyed by high temperatures, and even where the heat is not sufficient to boil away the zinc, the absorption of zinc into the weld metal produces an inferior section at the bottom of the weld.

This invention reduces the danger of overheating the beveled end face of a pipe by providing an inside bevel in addition to the outside bevel, and having the bevels meet at a substantial angle so that there are no thin sections or feather edges at the bottom of the seam. Feather edges overheat very quickly because of the small mass of metal.

In the brazing of galvanized pipes, the zinc absorbed from the galvanized surfaces tends to harden the bronze deposit at the face and root of the weld. There is, of course, no zinc absorption from the faces of the beveled pipe ends since only inside and outside surfaces of the pipes are coated with zinc. When the weld has its smallest section at the root, the absorption is sufficient to cause an embrittlement that causes the joint to fail in the root bend test. This invention makes the narrowest section of the bronze at a region intermediate the face and root where there is no zinc to be absorbed. The increased mass of bronze at the root of the weld and the greater width of the bronze minimizes the effect of the embrittling action at the root of the weld.

Other objects, features and advantages of the invention will appear or be pointed out as the specification proceeds.

In the accompanying drawing, forming a part hereof:

Fig. 1 is a sectional view through ordinary single bevel pipe edges in confronting relation preparatory to welding.

Fig. 2 is a sectional view showing the edges of Fig. 1 joined by a weld of the prior art.

Fig. 3 is a view partly in elevation, but mostly in section, showing pipe ends beveled for joining in accordance with this invention, the thickness of the pipe walls in proportion to their diameter being greatly exaggerated.

Fig. 4 is a sectional view of the upper side of the pipe ends shown in Fig. 3 after welding or brazing.

Fig. 5 is an end view of a pipe illustrating the manner in which the weld is made progressively around the circumference of the pipe.

Figs. 1 and 2 shows sections through one wall of confronting ends of pipes 8 and 9 each of which is shaped with an outside bevel surface 10 that extends the full distance from the outside surface 11 of the pipe 9 to the inside surface 13. The edge 15 along which the surfaces 10 and 13 intersect is a "feather edge," that is, an edge along which surfaces meet at a small acute angle, shown in Figs. 1 and 2 as approximately 30°. Because of the thinness of the metal there is danger of the metal being overheated along this feather edge 15. In order to avoid overheating such edges, a welding operator must limit his time of heating and in doing so the torch is sometimes removed from a region of the pipe ends before enough heat has soaked into the metal back of the end faces to make a good weld. If the walls of the groove between the pipe ends are not sufficiently heated, or if they cool too quickly, as from conduction losses into cold metal behind the end faces, the weld puddle is chilled and cannot be manipulated.

Fig. 2 shows a completed weld between the pipe ends illustrated in Fig. 1. Weld metal 17 has been melted into the V groove formed by the confronting bevel faces of the pipe ends. The weld shown has some reinforcement at both its top and bottom, that is, the weld metal 17 has a convex surface that projects beyond both the inside and outside surfaces 13 and 11 so that the weld is of somewhat greater thickness than the walls of the pipe.

There are additional disadvantages inherent in the feather edge 15 in the case of galvanized pipes. The fact that the feather edge heats up more rapidly than the remainder of the end face of the pipe makes it difficult to avoid burning the galvanizing off the inside surface 13 at the region adjacent the edge 15. The end face of the pipe is, of course, not covered with galvanizing.

In bronze welding, there is some absorption of zinc by the bronze along the regions where the bronze comes into contact with the galvanizing on the surfaces 11 and 13. The zinc thus absorbed produces an embrittlement of the bronze along those regions where weld metal is adjacent the galvanizing. This is of no importance at the top of the weld because the edge regions affected by zinc absorption are such a small part of the cross-section of the weld. The root of the weld is so narrow, however, that embrittlement of the bronze along both edges sometimes causes brazed joints to fail in the root bend test.

Fig. 3 shows the ends of pipes 18 and 19 in which the feather edge at the lower or inner edge of the end face has been eliminated by shaping the end faces of the pipes with inside bevels 20. Surfaces of the pipes 18 and 19 corresponding to surfaces of pipes 8 and 9 are indicated by the same reference characters. This improved end shape makes the bronze deposit wider at the bottom of the weld and thus reduces the effect of the embrittling action at the root of the weld. The beveled surfaces 10 and 20 meet along an edge or circular ridge 21 at a substantial angle that leaves no thin section of metal where there is danger of overheating, and even if the ridge 21 is heated more highly than the other regions of the end faces, it is away from the galvanized surface 13 and will not cause the zinc to be boiled away.

The radial extent of the inside bevel (that is, the difference in the distances from the pipe axis to the ridge 21 and to the inside surface 13) must be limited in order to obtain full penetration of the weld. It is preferably, but not necessarily, less than the radial extent of the outside beveled surface 10. With a wide angle V between the outside beveled surfaces of the pipe ends, the angle of the inside beveled surface 20 is preferably less than that of the outside bevel surface 10.

Although dimensions and angles may be chosen over a considerable range, some examples will be helpful for illustrating the order of distances and angles. With 6 inch galvanized pipe of standard wall thickness, a radial extent between $\frac{1}{16}$ and $\frac{3}{32}$ of an inch for the inside bevel gives good results with an angle of bevel of 30° to 45° for the surface 20. This angular range makes the included angle between the inside beveled surfaces on the confronting pipe ends from 60° to 90°.

The angle of the outside beveled surface 10 is preferably between 45° and 60°, making the included angle of the V groove from 90° to 120°. These illustrative values for angles of bevel make the angle of intersection of the surfaces 10 and 20 between 105° and 75°. Even the lower of these values produces a very blunt ridge 21 and smaller angles of intersection of surfaces 10 and 20 can be used, down to about 45°, without making the ridge 21 a feather edge. The feature of removing the ridge 21 from the galvanized surface 13 is, of course, independent of the angle at which the inside and outside bevel surfaces meet and could be retained even though the beveled surfaces met at such a small angle that they did produce a feather edge.

After shaping the pipe ends to produce edge faces such as shown in Fig. 3, the pipes 18 and 19 are coated with flux to protect the galvanizing throughout the heat-affected areas. On 6 inch standard pipe the pipes are coated with flux for a distance of about 2 inches for braze welding. The pipes are then brought together with the ridge 21 of pipe 19 spaced from the corresponding ridge of the pipe 18, as illustrated. In order to obtain full penetration with weld metal applied from the outside of the seam between the pipe ends, it is important that the ridges 21 be spaced apart.

The pipe may be held in alinement by tack welds 23 at spaced points around the seam. Filler material 24 is then melted into the seam to weld the pipe ends together, as shown in Fig. 4. The filler material is melted from a rod 25 (Fig. 5) by a flame 26 of a torch 27 that is directed against the end faces of the pipe and the welding rod to fuse the filler material to the pipe ends. The welding operation is carried out progressively around the seam as illustrated in Fig. 5 but it is not essential that the entire depth of filler material be deposited in one pass. The connection is preferably made with a seam brazing material that melts and flows at a temperature not greater than 1650° F.

Changes and modifications can be made, and as to some features of the invention, plate edges are the mechanical equivalent of pipe ends. Some of the features of the invention can be used without others without departing from the invention as defined in the claims.

I claim:

1. The method of brazing galvanized pipes which comprises shaping the end face of each pipe with an outside bevel and an inside bevel, the radial extent of the inside bevel being less than that of the outside bevel, positioning the pipes with the beveled ends confronting one another, and melting into the seam between the pipe ends entirely from the outside of the pipes and progressively around the circumference of the seam by means of a gas flame, brazing material that melts at a temperature lower than the fusion point of the metal of the pipes and lower than the boiling point of zinc.

2. The method of brazing galvanized pipes together in end to end relation, which method comprises initially beveling the end face of each pipe with both an outside and an inside bevel, the inside bevel being of substantially less radial extent than the outside bevel, coating the galvanizing with flux for a distance back from the pipe end as far as the galvanizing will be affected by the heat of the brazing operation, placing the pipes with their beveled ends in confronting relation, and brazing the pipes together by melting into the seam between the pipe ends, entirely from the outside, brazing material that melts at a temperature lower than the fusion point of the metal of the pipes and lower than the boiling point of zinc.

3. The method of brazing described in claim 2 characterized by melting into the seam brazing material that melts and flows at a temperature not greater than 1650° F.

4. The method of brazing together in end-to-end relation galvanized pipes that are galvanized both inside and outside, which method comprises beveling the inside edge of each pipe end for a radial distance of the order of one-eighth inch and at an angle between 30° and 45°, beveling the outer edge of each pipe end to meet the inside bevel and at an angle between 45° and 60°, coating both the inside and outside galvanized surfaces for about two inches back from the pipe ends with a protecting flux, placing the pipes in alinement with their end faces spaced apart by a distance of the order of one-eighth inch, connecting the pipe ends together in such relation by tack welding said ends at several spaced points around the circumference of the pipe ends, and then filling the seam between the confronting faces of the pipe ends with bronze from a filler rod by melting the rod into the seam from the outside of the seam and progressively around the seam with the flame of an oxyacetylene torch.

5. A brazed joint between the end portions of galvanized pipe sections, said joint including an outside beveled surface on each of the pipe ends, an inside beveled surface on each of said pipe ends of less radial extent than the outside beveled surface and meeting said outside beveled surface in a circular ridge, and brazing material joined to the pipe ends over both the outside and inside beveled surface, said material having a fusion point that is at a lower temperature than the fusion temperature of the metal of the pipe sections and at a lower temperature than the boiling point of the zinc in the galvanizing coat.

ROBERT M. ROOKE.